J. A. STEVENSON.
APPARATUS FOR THE MIXTURE IN PREDETERMINED PROPORTIONS OF YEASTS AND AN ACCELERATING MIXTURE.
APPLICATION FILED FEB. 27, 1912.
1,060,143.
Patented Apr. 29, 1913.
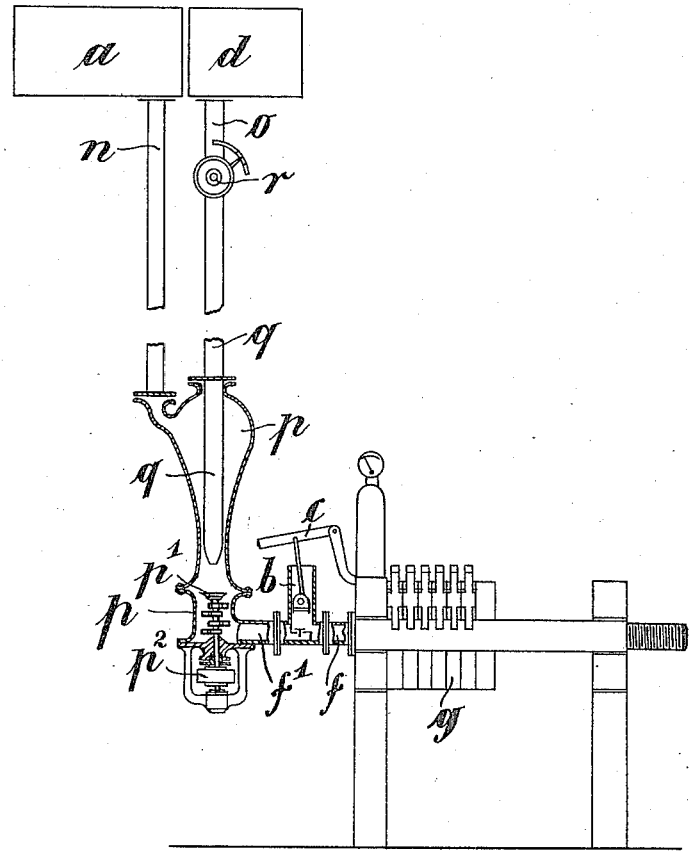
WITNESSES:
John C. Sanders
Albert F. Heuman
INVENTOR:
John Atherton Stevenson
By M. Wallace White
ATTY

UNITED STATES PATENT OFFICE.

JOHN ATHERTON STEVENSON, OF ACTON, ENGLAND.

APPARATUS FOR THE MIXTURE IN PREDETERMINED PROPORTIONS OF YEASTS AND AN ACCELERATING MIXTURE.

1,060,143.  Specification of Letters Patent.  Patented Apr. 29, 1913.

Application filed February 27, 1912. Serial No. 680,251.

*To all whom it may concern:*

Be it known that I, JOHN ATHERTON STEVENSON, subject of the King of Great Britain and Ireland, residing at 6 Malvern Villas, Acton, W., in the county of Middlesex, England, have invented new and useful Improvements in Apparatus for the Mixture in Predetermined Proportions of Yeasts and an Accelerating Mixture, of which the following is a specification.

My invention relates to mixing apparatus for the treatment of fermentable substances, viz:—yeasts of all descriptions and an accelerating mixture, and has for its object the mixing or treatment in definite proportions of such substances in a fluid condition, in order to incorporate at once with the said yeast any accelerating agent, such for instance as sugar, malt extract, and the like, which latter agent increases the fermentability of the mixture, when the fermentation is to ultimately take place, after the mixture has been put on the market, but which during the time between incorporation and the time of designed ultimate fermentation no operative effect of the accelerating agent can take place.

My invention consists in placing separately under hydrostatic pressure the fermentable substance and the accelerating agent and delivering them in a proportionate amount into a compressing device adapted to get rid of all the liquid from the compressed substance after the proper compression has taken place, in order that a dry product may be finally obtained, which will contain latent fermentability capable of being brought into action under heat and moisture.

I use hydrostatic pressure obtained by heightened sources of supply consisting of two elevated tanks each containing separately two liquid substances. In this case each substance is under a constant head and the ultimate mixture can be regulated in the discharge pipes from the sources of supply to make a proportionate mixture in a mixing device and taken from the said mixing device by a pump to a common pipe leading to the compression device.

In order that the invention may be the better understood I will now proceed to describe the same, in relation to the accompanying drawing, reference being had to the letters marked thereon.

The figure is a part sectional view in elevation of an apparatus for mixing two materials by hydrostatic pressure.

In the drawing there are two separate tanks $a$ and $d$, each containing one of the two substances that are to be mixed. The pipes $n$ and $o$ lead from these tanks and are connected to an outer chamber $p$ having an internal pipe $q$ which is a continuation of the pipe $o$. The pipe $o$ is provided with a scaled valve $r$ so as to proportionate the flow, produced by the head from the tanks $a$ and $d$, of one substance to the other substance. The substances so delivered are thus proportionately mixed in the lower portion of the mixing device $p$ where they are delivered on to an agitator formed of a vertical shaft $p'$ fitted with horizontal mixers, the lower part of shaft $p'$ being brought through a stuffing box and having a driving pulley $p^2$ outside, which can be driven by any suitable engine or shaft. The mixture thus formed passes by the exit $f'$ to a pump $b$, which when operated by the handle $c$ ejects the mixed products by the pipe $f$ to the filter press $g$ where the mixture is subjected to pressure which causes the liquid in the mixture to be removed.

Having thus fully described my invention I claim as new and desire to secure by Letters Patent:—

1. Apparatus for mixing yeast with an accelerating mixture in definite proportions, consisting of the combination of two separate sources of supply placed at a height, a mixing apparatus, a filter press, pipes from the said sources of supply conveying their contents by gravity to the said mixing apparatus, one of the said pipes being provided with adjustable means to proportion the relative flow of the said substances to each other, and means communicating respectively with said mixing apparatus and with said filter press for further mixing and ejecting the mixture into the said filter press.

2. Apparatus for mixing yeast with an accelerating mixture in definite proportions, consisting of the combination of two separate tanks placed at a height, a mixing device, pipes from the said tanks communicating with said mixing device, the end of one of the said pipes being placed within the said mixing device, one of the said pipes being fitted with a marked valve to adjust its flow to the amount of flow in the other pipe, said mixing device including an agitator, a pump having inlet connection with said mixing device, and a filter press connected with the outlet of said pump, the pump drawing the mixed product and ejecting it into the said filter press.

In testimony whereof I have signed my name to this specification in the presence of two subscribing witnesses.

JOHN ATHERTON STEVENSON.

Witnesses:
JOHN C. FELL,
CHARLES J. R. BULLOUGH.